United States Patent [19]
Reed

[11] Patent Number: 5,131,682
[45] Date of Patent: Jul. 21, 1992

[54] SEAT BELT APPARATUS FOR SLEEPERS

[76] Inventor: Rosemary J. Reed, 4817 Catskill Dr., Old Hickory, Tenn. 37138

[21] Appl. No.: 624,727

[22] Filed: Dec. 10, 1990

[51] Int. Cl.$^5$ ............................................ B60R 22/00
[52] U.S. Cl. ................................... 280/801; 297/468
[58] Field of Search ............... 280/801, 808; 297/468, 297/483, 484, 486

[56] References Cited

U.S. PATENT DOCUMENTS

| | | | |
|---|---|---|---|
| 3,819,197 | 6/1974 | Shakespear | 297/484 |
| 4,324,204 | 4/1983 | Friedman | 119/96 |
| 4,583,253 | 4/1986 | Hall | 5/94 |
| 4,667,356 | 5/1987 | Holmquist | 5/431 |
| 4,706,992 | 11/1987 | Downing et al. | 280/801 |

FOREIGN PATENT DOCUMENTS 2034740  1/1972  Fed. Rep. of Germany ...... 280/808

Primary Examiner—Kenneth R. Rice
Attorney, Agent, or Firm—Edward D. Lanquist; Mark J. Patterson

[57] ABSTRACT

The present application describes a seat belt for use by a sleeper. In one embodiment, the first end of a belt is releasably attached to the second end of a belt. This belt is then attached to the existing seat belt system of a vehicle or to a seat belt bracket that is attached to the vehicle. In a second embodiment, a retractable belt encircles the seat.

10 Claims, 2 Drawing Sheets

SEAT BELT APPARATUS FOR SLEEPERS

BACKGROUND OF THE INVENTION

The present invention relates generally to a seat belt for use in a motor vehicle and more particularly to a seat belt to be used by a sleeping motor vehicle passenger.

It will be appreciated by those skilled in the art that children and others sleep while riding in a car. The existing seat belts in cars tend to irritate a sleeper. More importantly, existing seat belts cannot protect a user in a sleeping position, because they are intended to protect the user in a seated position. To this end, there have been several attempts to provide such a device. Parents can attest to the fact that children cannot easily sleep in an upright position. If a child is not allowed to sleep, he or she will become very cranky. Presently, parents usually allow their children to release their seat belt and lie on the back seat. This places the child at risk.

One such attempt is disclosed in U.S. Pat. No. 4,583,253, issued to D. Hall on Apr. 22, 1986, for a "Baby Sleeper for Automobiles". As the title denotes, Hall requires that the baby be strapped into a box that is, in turn, strapped to the bottom of a seat. Unfortunately, this device will not work with children older than babies, because the box would have to be too large. Similarly, U.S. Pat. No. 4,667,356, issued to M. Holmquist on May 26, 1987, discloses an "Adjustable Infant Bed and Seat". This patent also requires an additional seat that cannot be used with a child older and larger than an infant.

U.S. Pat. No. 4,324,204, issued to M. Friedman, discloses an "Animal Safety Restraint for Vehicles". This patent discloses a very complex harness method to hold an animal such as a dog against the back of a seat. It fails to take advantage of the existing seat belts in a vehicle. Further, the harness cannot be used with a child, because the rear straps that attach to the back of the seat terminate well above seat level.

What is needed, then, is a seat belt apparatus for sleepers. This needed apparatus must be able to utilize portions of the existing seat belts in vehicles. Further, the needed apparatus must not require an additional seat or box member that can only be used by children of a given size. This apparatus is presently lacking in the prior art.

SUMMARY OF THE INVENTION

In one embodiment of the present device, a belt is attached at one end to a first tab and at the second end to a first clasp. The first tab and the first clasp are joined to form a continuous belt. This continuous belt is adjustable at one of the connection means Between the first tab and the first clasp is placed slidably on the belt a second tab that fits into an existing seat clasp that is added to the vehicle and bolted to the floor.

In a second embodiment, a retractable seat belt is bolted to the floor of the vehicle. This belt comes between the seat and the seat back. A clasp is attached to a strip riveted on the bottom of the seat. The tab attaches to the clasp to encircle the user.

Accordingly, one object of the present invention is to provide a seat belt that can be used by a sleeper.

Still another object of the present invention is to provide a seat belt that can, in certain embodiments, use existing seat belt mechanisms.

Still another object of the present invention is to provide a seat belt for sleepers that does not require additional mechanisms or structure and can be used by persons of different sizes and ages.

DESCRIPTION OF THE PREFERRED EMBODIMENT

Figure 1:
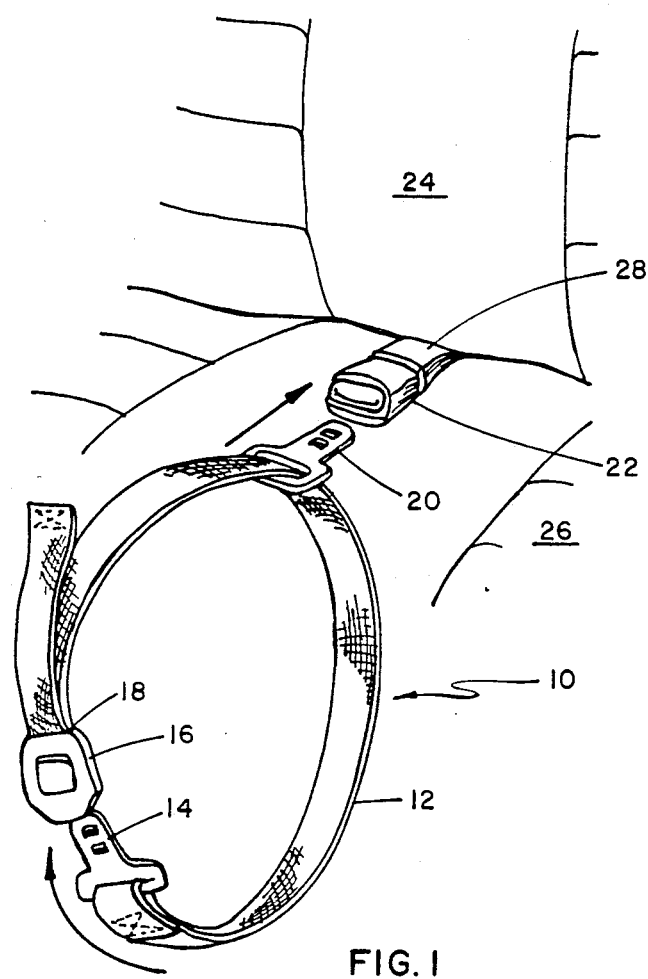
FIG. 1 is a perspective view of the seat belt apparatus for sleepers of the present invention.

Referring now to FIG. 1, there is shown generally at 10 the seat belt apparatus for sleepers of the present invention. Belt 12 has first tab 14 attached to one of its ends and first clasp 16 attached to the other end. The attachment of belt 12 to first tab 14 and first clasp 16 can be fixed attachment, releasable attachment, or adjustable attachment. In the preferred embodiment, belt 12 is fixedly attached to first tab 14 and adjustably attached to first clasp 16 at roller 18. When first tab 14 releasably attaches to first clasp 16, belt 12 becomes endless. The circumference of belt 12 is adjustable by pulling belt 12 through roller 18 of first clasp 16. In the preferred embodiment, first tab 14 is a standard seat belt tab, and first clasp 16 is a standard seat belt clasp. Second tab 20 is slidably attached to belt 12 between first tab 14 and first clasp 16. Second tab 20 is, in the preferred embodiment, a standard seat belt tab also. In FIG. 1, second tab 20 fits into existing seat clasp 22. As is generally known, existing seat clasp 22 penetrates seat between seat back 24 and seat 26.

Figure 2:
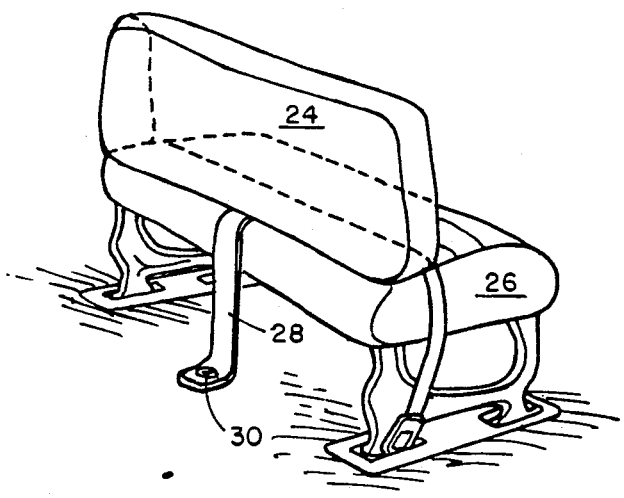
FIG. 2 is a rear perspective view showing an additional clasp and bracket as the bracket is bolted to the floor of the vehicle.

As can be seen in FIG. 2, if vehicle does not have an existing seat belt clasp, clasp 22 can be attached to bracket 28. Bracket 28 is, in turn, attached to vehicle by bolt 30. Bracket 28 can be attached to the vehicle in any manner of fixed or releasable attachment.

Figure 3:
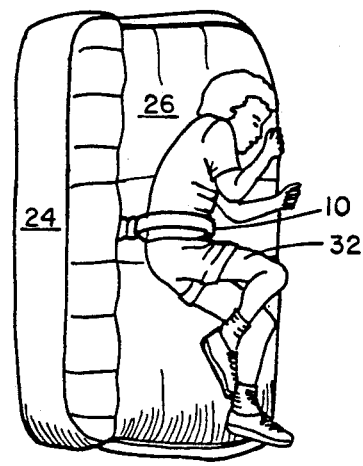
FIG. 3 is a plan view showing the operation of the seat belt apparatus for sleepers as it is used by a sleeper.

As can be seen in FIGS. 1-3, user will take seat belt apparatus 10 and releasably attach second tab 20 to seat clasp 22. User 32 will then place belt 12 around him or her and attach first tab 14 into first clasp 16. Belt 12 will then be adjusted by pulling end of belt 12 through roller 18. User can then lie down and feel both comfortable and secure.

Figure 4:
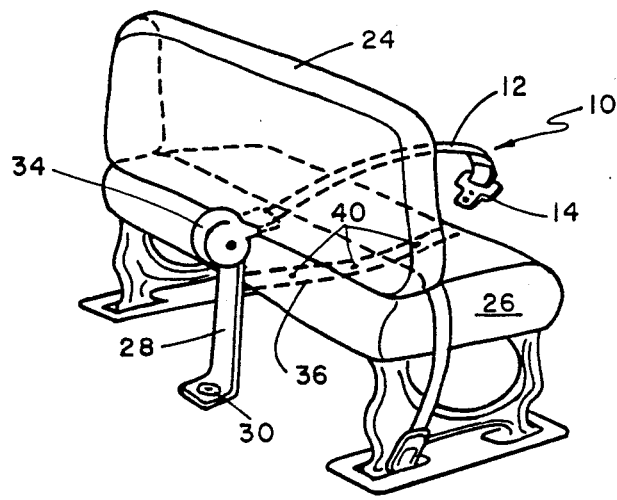
FIG. 4 is a rear perspective view of the retractable embodiment of the seat belt apparatus for sleepers.

Referring now to FIG. 4, there is shown generally at 10 the retractable seat belt embodiment of the present invention. In this embodiment, retractor 34 is fixed to vehicle floor by, in this instance, a bolt. However, any method of fixed or releasable attachment can be used. In this instance, belt 12 is fit into retractor 34. End of belt 12 is attached to first tab 14. Strip 36 is attached to underside of seat 26. In the preferred embodiment, a rivet or bolt is used. However, any method of fixed or releasable attachment may be used.

Figure 5:
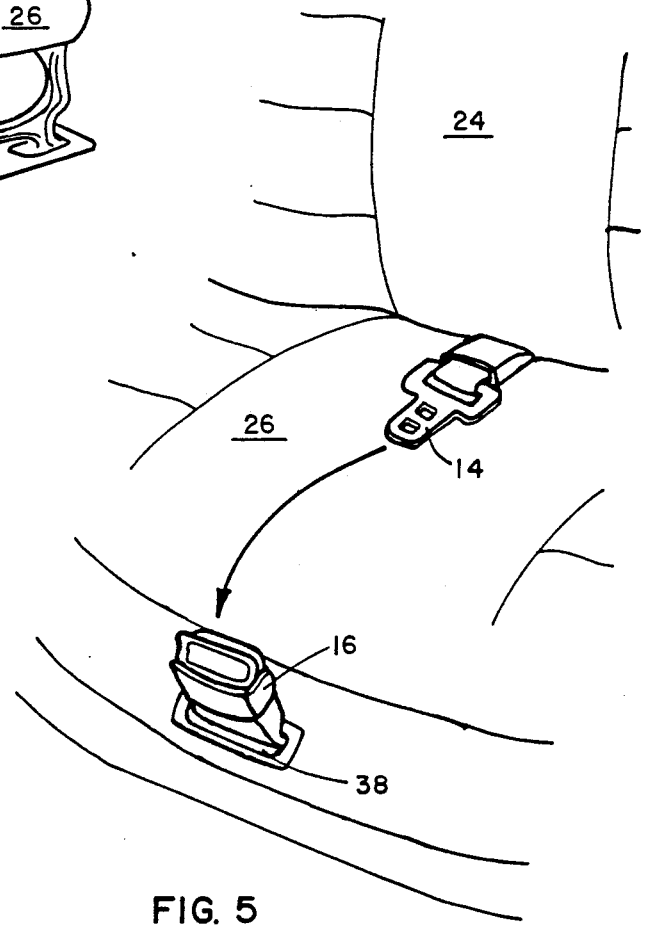
FIG. 5 is a front perspective view of the retractable seat belt embodiment for the seat belt apparatus for sleepers.

As can be seen in FIG. 5, first clasp 16 can be placed through slot 38 in seat 26. In another embodiment, clasp 16 comes from underneath seat 26 when no slot 38 is available. Tab 14 is then placed into clasp 16.

Figure 6:
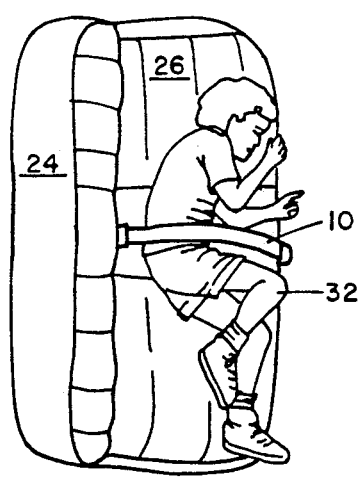
FIG. 6 is a plan view of the retractable seat belt embodiment of the seat belt apparatus for sleepers.

As can be seen in FIGS. 4-6, user 32 will lie on seat 26. He or she will then grasp tab 14, pulling over him or her and placing it in clasp 16. When finished, clasp 16 is released from tab 14. Once again, user can feel both safe and comfortable.

The retractable belt embodiment 12 of the present invention is best used in an automobile that has no area exposed behind the seat. For example, a four door sedan has no easy access behind the seat. This embodiment would be best used if manufactured with the automobile.

In the embodiments shown in FIGS. 1-3, when apparatus 10 is not in use, it can be stored under the seat or in a glove box.

Thus, although there have been particular embodiments of the present invention of a new and useful seat belt apparatus for sleepers, it is not intended that such references be construed as limitations upon the scope of this invention, except as set forth in the following claims.

What is claimed is:

1. A seat belt apparatus for use by a sleeper on a seat having a back and an existing seat belt system having a seat clasp comprising:
   a. a belt having a first end and a second end;
   b. means to releasably attach said first end to said second end;
   c. means to adjust distance of said belt between said first and said second end; and
   d. a first tab slidably attached to said belt between said first end and said second end to attach said belt to said seat clasp.

2. The device of claim 1 wherein said means to releasably attach said first end to said second end comprises:
   a. a clasp attached to said first end; and
   b. a tab attached to said second end.

3. The apparatus of claim 1 wherein the means to adjust the distance between said first end and said second end is a roller attached at either of said first or second ends.

4. A seat belt apparatus for use by a sleeper on a seat having a back and an existing seat belt system having a seat clasp comprising:
   a. a belt having a first end and a second end;
   b. means to releasably attach said first end to said second end;
   c. means to adjust distance of said belt between said first and said second end;
   d. means to attach said belt to said seat clasp; and
   e. wherein said means to attach said belt to said seat clasp comprises a tab slidably attached to said belt between said first end and said second end.

5. Seat belt apparatus for use by a sleeper in a vehicle on a seat having a back comprising:
   a. a seat belt bracket means having a first clasp;
   b. a belt having a first end and a second end;
   c. means to releasably attach said first end to said second end;
   d. means to adjust distance between said first end and said second end of said belt; and
   e. a first tab slidably attached to said belt between said first end and said second end to attach said belt to said first clasp of said seat belt bracket means.

6. The device of claim 5 wherein said seat belt bracket means comprises a bracket attached to said vehicle.

7. The device of claim 5 wherein said means to releasably attach said first end to said second end comprises:
   a. a first clasp attached to said first end; and
   b. a second tab attached to said second end.

8. The device of claim 5 wherein said means to adjust said distance between said belt between said first end and said second end comprises a roller attached at either of said first end or said second end.

9. The device of claim 5 wherein said means to attach said belt to said bracket means comprises a first tab and a first clasp.

10. A seat belt apparatus for use by a sleeper in a vehicle on a seat having a back and a front comprising:
    a. a bracket attached to said vehicle;
    b. a retractor attached to said bracket;
    c. a clasp attached proximate to said front of said seat;
    d. a belt having a first end and a second end, said first end received by said retractor proximate to said seat; and
    d. a tab attached to said second end of said belt releasably received by said clasp to attached said belt to said seat.

* * * * *